United States Patent [19]
Eckert

[11] Patent Number: 4,964,389
[45] Date of Patent: Oct. 23, 1990

[54] FUEL INJECTION DEVICE FOR INTERNAL COMBUSTION ENGINES

[75] Inventor: Konrad Eckert, Stuttgart, Fed. Rep. of Germany

[73] Assignee: Robert Bosch GmbH, Stuttgart, Fed. Rep. of Germany

[21] Appl. No.: 424,643

[22] Filed: Oct. 20, 1989

[30] Foreign Application Priority Data

Dec. 23, 1988 [DE] Fed. Rep. of Germany ....... 3843467

[51] Int. Cl.⁵ ............................................. F02M 39/00
[52] U.S. Cl. .................................... 123/447; 123/494; 123/300; 123/450
[58] Field of Search ................ 123/447, 494, 300, 299, 123/450, 458; 417/462, 253

[56] References Cited

U.S. PATENT DOCUMENTS

| | | | |
|---|---|---|---|
| 2,986,881 | 6/1961 | Moore | 123/447 |
| 3,568,646 | 3/1971 | Wehde | 123/447 |
| 4,282,843 | 8/1981 | Seilly | 417/253 |
| 4,377,139 | 3/1983 | Jarrett | 123/450 |
| 4,409,939 | 10/1983 | Fheim | 123/447 |
| 4,541,385 | 9/1985 | Eheim | 123/447 |
| 4,627,403 | 12/1986 | Matsumura | 123/447 |

FOREIGN PATENT DOCUMENTS 0119962 7/1983 Japan ................................. 123/447

Primary Examiner—Carl S. Miller
Attorney, Agent, or Firm—Edwin E. Greigg

[57] ABSTRACT

A fuel injection device for internal combustion engines having externally supplied ignition, which enables introducing fuel injection quantities into combustion chambers in a manner that is controlled precisely in terms of quantity and of the instant of injection. The fuel injection device includes a first magnet valve by which fuel at injection pressure is pre-stored in a reservoir chamber, and the pre-stored quantity is ascertained by measurement of the deflection stroke of a reservoir piston which defines the reservoir chamber. Once the pre-storing process is complete, the pre-stored fuel quantity is then delivered to the injection valve with the air of a second magnetic valve. All that the fuel injection pump needs besides the two magnet valves and a control unit is a pre-feed pump, which pumps fuel into a high-pressure reservoir, so that while making limited demands on the pump generating the high pressure, a simple and very precisely functioning fuel injection device is created.

22 Claims, 2 Drawing Sheets

FUEL INJECTION DEVICE FOR INTERNAL COMBUSTION ENGINES

BACKGROUND OF THE INVENTION

The invention is based on a fuel injection device as defined herein. In such a device, known from German Offenlegungsschrift No. 1 576 626, the control of the fuel injection quantity pre-stored in the reservoir chamber is effected with the aid of the opening time of the first electrically controlled valve, and this opening time is controlled by the electrical control unit. For exact metering of the fuel injection quantity, it is therefore necessary on the one hand to keep the high-pressure reservoir at a very constant pressure, and on the other hand to provide a throttle in the connection between the high-pressure reservoir and the reservoir chamber, to assure a slow, uniform flow of fuel to the fuel injector. The reservoir chamber provided in the known fuel injection device is also loaded by a restoring spring, so that with increasing deflection of the movable wall of the reservoir chamber counter to the force of the restoring spring, the pressure drop at the throttle between the high-pressure reservoir and the reservoir chamber is lessened. The flow of fuel then lessens accordingly, so that the filling rate of the reservoir chamber decreases over the opening time of the first electrically controlled valve. This creates problems in terms of the exact metering of the fuel injection quantity and at the very least necessitates a complicated compensatory control of the opening time of the first electrically controlled valve.

OBJECT AND SUMMARY OF THE INVENTION

With the fuel injection device according to the invention as defined herein, exact control of the fuel quantity to be injected is advantageously attained by measuring and regulating the filling stroke of the movable wall of the reservoir chamber in such a way that the required fuel quantity to be injected, is pre-stored in the reservoir chamber and the pre-set pressure is obtained prior to the injection onset.

With this fuel injection device according to the invention, the onset of the fuel injection can advantageously be selected freely within virtually arbitrary limits, regardless of the fuel quantity to be injected. The selectability of the injection onset has no effect on the fuel quantity to be injected. Nor do the fuel viscosity, the opening pressure of the injection valves, or the degree to which these valves have become plugged with carbon have any affect on the fuel quantity to be injected; at most, these factors affect the duration of fuel injection. Moreover, the pressure contained in the high-pressure reservoir has no effect on the injection quantity or the supply onset, since the injection pressure is determined by the restoring force acting on the adjustable wall of the reservoir chamber. The demands made of the feed pump and its control are accordingly minor, so that simple, economical pumps can be used.

The fuel injection quantity pre-stored for injection can advantageously attain injection in a plurality of increments, via incremental opening of the second electrically controlled valve; in particular, this makes a pre-injection possible, which has a favorable effect on quiet engine operation and on fuel preparation. Particularly in Otto engines, fuel can be injected into the combustion chamber very early, still during the intake stroke of the engine piston; by the instant it ignites, the fuel is optimally prepared because of the heat prevailing in the combustion chamber and the movement within the charge.

Also advantageously, the injection period can also be lengthened by a controlled throttle, so that once again long preparation times are available for the fuel introduced into the combustion chamber of an Otto engine. This provision has advantages in Diesel engines as well, with a favorable effect in terms of reducing noise during idling. It is advantageous if the throttle, instead of merely being brought into play, can also be varied in its cross section, thus resulting in optimally long injection times even when the fuel injection quantity is decreasing. Advantageously, the throttling can be restricted to the pre-injection, as described hereinafter, so that the primary injection quantity is introduced just before top dead center of the applicable engine piston. This feature is equally advantageous for Otto and Diesel combustion processes. Advantageous structural features of the fuel injection device according to the invention are also described hereinafter.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
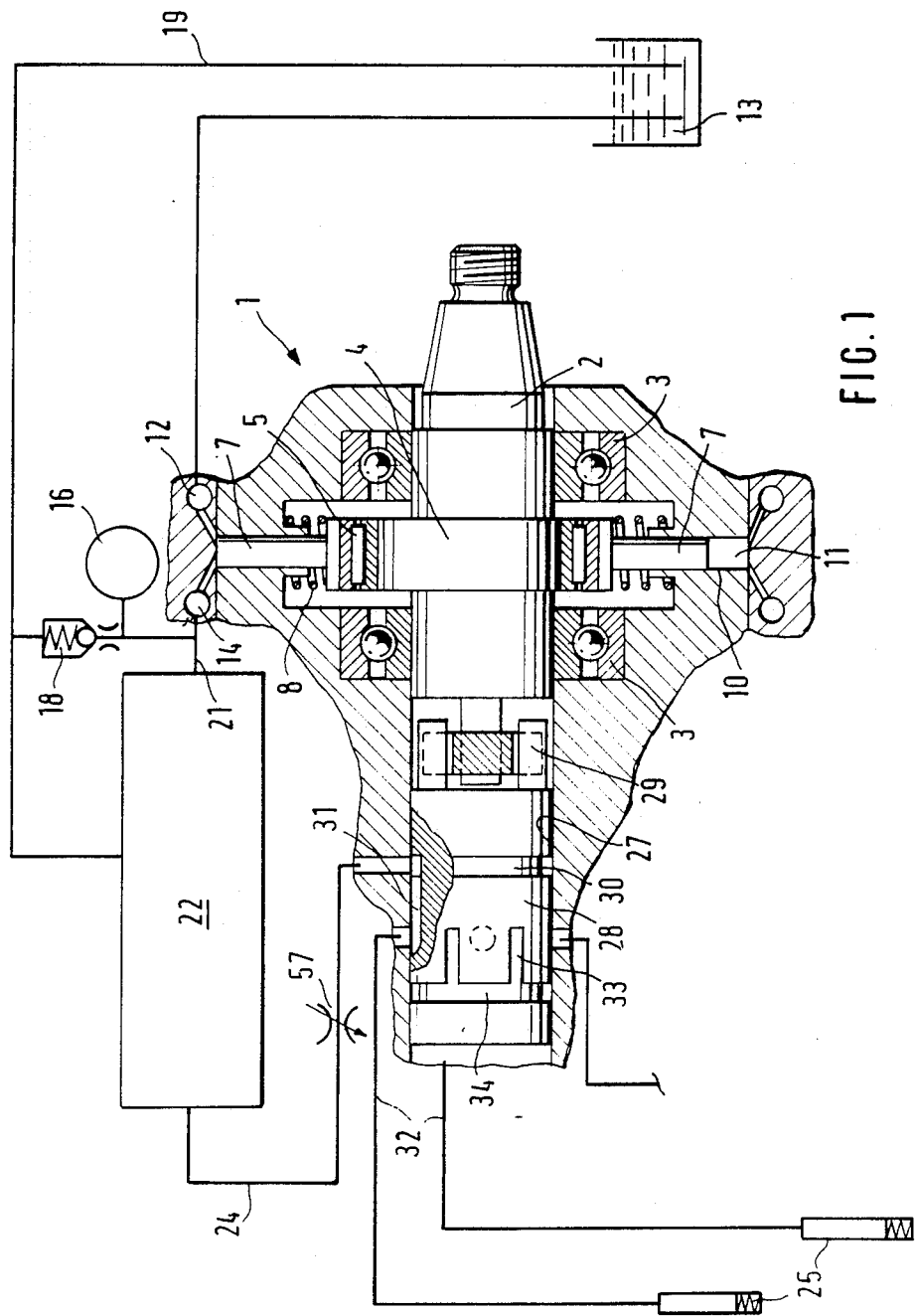
FIG. 1 is a schematic view of the fuel injection device according to the invention.

In the fuel injection device of FIG. 1, a feed pump 1 is schematically shown, having a drive shaft 2 that is supported on roller bearings 3 in a housing and has a cam 4 that has a needle bearing or roller bearing 5 on its periphery. Radially to the cam 4, two diametrically opposed pump pistons 7 are retained on the outer race of the bearing 5 by springs 8, so that the pump pistons are set into reciprocating motion when the drive shaft 3 rotates. The pump pistons are displaceable in cylinder bores 10, in which they define pump chambers 11, which communicate via an intake valve 12 with a fuel supply tank 13 and via a feed valve 14 with a high-pressure reservoir 16. A relief line 19 including a one-way pressure control valve 18 leads from the high-pressure reservoir back to the fuel supply tank or to the intake side of the feed pump 1. With the aid of the pressure control valve or pressure limiting valve 18, a predetermined pressure is built up and maintained in the high-pressure reservoir.

The high-pressure reservoir 16 communicates via a pressure line 21 with a control block 22, from which, as will be explained in further detail below in conjunction with FIG. 2, the fuel arriving for injection is drawn from the high-pressure reservoir and delivered via a connecting line 24 to an injection valve 25 for injection. Injection valves 25 are provided in the usual manner, in accordance with the number of cylinders of the associated engine, and introduce the fuel arriving for injection directly into the engine combustion chambers.

In the exemplary embodiment of FIG. 1, the connecting line 24 leads into a cylinder 27, in which a distributor 28 driven by the pump shaft 2 is rotatably supported. To this end, the distributor is connected via a coupling 29 to the drive shaft 2 and aligned coaxially with the drive shaft. The connecting line 24 discharges into the region of an external annular groove 30 in the jacket face of the distributor. Leading away in the axial direction from the external annular groove is a distributor groove 31, which comes to communicate in alternation with injection lines 32 leading away from the cylinder 27. These injection lines are distributed about the circumference of the cylinder in accordance with the injection strokes, each line leading to one injection valve 25 mounted on the engine. A plurality of longitudinal grooves that discharge into a common annular groove 34 are disposed on the jacket face in the vicinity of the mouths of the injection lines 32. These longitudinal grooves come to communicate with the injection lines whenever the injection lines are disconnected from the distributor groove 31. Accordingly, the pressures partially built up in the injection lines can be equalized, so that each time an injection line is newly approached by, the distributor groove, the same pressure conditions will prevail at the onset of the injection. This makes it possible to compensate for fluctuations in injection quantity resulting from idle volumes that need to be filled. For uniform radial loading of the distributor, a longitudinal compensation groove may also be provided upstream of the external annular groove 30 to compensate for the radial forces exerted via the distributor groove 31.

Figure 2:
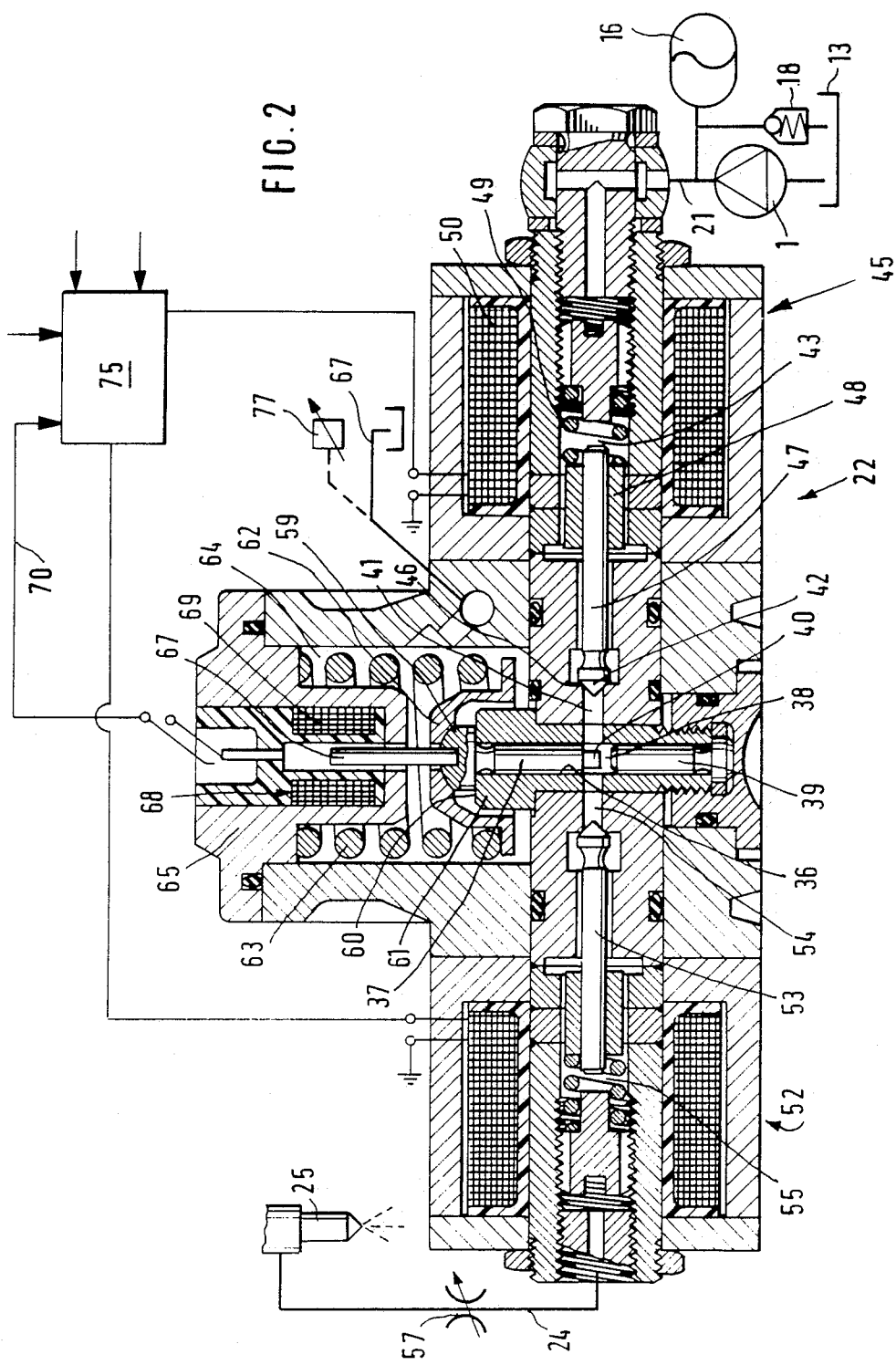
FIG. 2 shows a detail of the control block referred to in FIG. 1.

The control block, which is shown in section in FIG. 2, has a reservoir cylinder 36 in its middle, in which a reservoir piston 37 is supported in a tightly displaceable manner. On one face end, the reservoir piston encloses a reservoir chamber 38, which is defined on the other side by a plug 39 inserted axially into the reservoir cylinder 36. In its terminal position, with a tang 40 mounted on its face end, the reservoir piston 37 takes up virtually the entire reservoir chamber 38, so that, without coming into contact with the plug 39, it keeps the residual volume of the reservoir chamber very small. A pressure line 41 leads radially away from this residual space, embodied primarily as an annular chamber, of the reservoir chamber 38 and discharges via a valve seat 42 into an armature chamber 43 of a first electrically controlled valve, embodied here as a magnetic valve 45. Cooperating with the valve seat is the sealing face 46 of a valve needle 47, which is part of an armature 48 of the first magnetic valve 45 and is urged in the closing direction by a compression spring 49. The armature chamber 43 is enveloped by a magnet winding 50 of the electromagnet valve 45 and communicates, on the side axially opposed to the valve needle 47, with the pressure line 21. Opposite the first magnet valve 45 in mirror symmetry is a second electrically controlled valve 52, which with its valve needle 53 controls a pressure line 54 leading away from the reservoir chamber 38 diametrically opposite the pressure line 41. When the magnet valve is open, this pressure line 54 discharges into the armature chamber 55 of the second magnet valve 52, which is embodied identically to the first magnet valve 45. Once again, the armature chamber communicates on the side axially opposite the valve needle 53 with a pressure line, which in this case is the connecting line 24 that leads to the injection valve 25. If a separate control block is provided for each injection valve, then the second magnet valve 52 is connectable to only one injection valve 25 at a time. Otherwise, the injection valves may be approached via a distributor as in FIG. 1, and only a single control block need be provided, although in that case the magnet valve switching times are correspondingly frequent. A controllable throttle 57 may also be disposed in the connecting line 24.

On its end protruding out of the reservoir cylinder 36, the reservoir piston 37 is provided with a head 59, with which it comes to rest on the face end 60 of a liner 61 which contains the reservoir cylinder 36 and serves as a stop limitation. The head is engaged by a spring plate 62, which in turn is a support point for a restoring spring 63, which is supported on a plug 65 that closes a spring chamber 64 in the housing of the control block. The movable part 67 of a travel transducer, which may be embodied as an inductive transducer 68, as in the present instance, protrudes axially past the head 59 of the reservoir piston 37. The stationary part has a coil body 69, and the movable part 67 has a barlike element that extends into the interior of the coil body. The output of the inductive transducer 68 is connected via a control line 70 to a control unit 75, by which in turn the first and second magnet valve are triggered. In the control unit, set-point values and switching time control signals for the magnet valves 45, 52 are formed, and thus the quantity of fuel arriving at injection and the instant of injection are controlled. To this end, the control unit also receives signals for the position of the pistons of the engine, in order to synchronize the injection to the piston movement.

The spring chamber 64 can be relieved via a leakage line 67, through which the unavoidable leakage loss at the reservoir piston can be carried away. However, via the leakage line 67, it is also possible to keep the spring chamber at a controlled pressure by means of a pressure control device 77, which makes it possible to vary the restoring force and thereby the injection rate of the fuel arriving for injection.

The device described above functions as follows:

With the aid of the feed pump, with the fuel injection device driven, the high-pressure reservoir 16 is kept at a pressure defined by the pressure valve 18. For a version in which one control block per injection valve is provided, the first magnet valve is then opened with the aid of the control unit 75, so that the fuel, kept at high pressure, can flow out of the high-pressure reservoir to reach the reservoir chamber 38. When the second magnet valve 52 is closed simultaneously, the reservoir piston undergoes a deflection counter to the force of the spring 63 until such time as the travel transducer 68 furnishes a signal value that corresponds to the set-point value formed in the control unit. This set-point valve is the standard for the quantity of fuel to be injected in the next injection stroke and is derived from engine operating parameters and from the torque or load demand made by the driver. Once the setpoint value is attained, the first magnet valve 45 is closed and the filling of the reservoir chamber 38 is ended. This filling may already be effected immediately after the end of the preceeding injection stroke, and should be ended at the earliest possible injection onset. For this purpose, however, a large proportion of the fuel exchange times of the engine is available, and particularly in the four-stroke combustion engine, these times are very long in proportion to the injection duration. Because of the time that is available, very exact pre-storage of fuel, brought to high pressure or injection pressure, from the high pressure reservoir 16 into the reservoir chamber 38 can be effected.

For the onset of injection into the applicable combustion chamber of the engine, controlled by engine operating parameters, the second magnet valve 52 is put into the open position by the control unit, so that the fuel can flow out of the reservoir chamber via the connecting line 24 to the injection valve 25. In every position of the reservoir piston, the pressure in the reservoir chamber 38 is greater than the opening pressure of the injection valve. This discharging of the reservoir chamber can also be done intermittently, such that first, the second magnet valve opens briefly at injection onset, in order to withdraw a pre-injection quantity from the reservoir chamber 38, the remaining quantity of which, after an interval, is delivered to the injection valve 25 as the primary injection quantity.

With the aid of the controllable throttle 57 in the fuel line 24, the fuel flow between the reservoir chamber 38 and the injection valve 25 can also be throttled in such a way that while the fuel injection quantity remains unchanged, the injection duration is prolonged compared with the unchanged state. The controllable throttle can be suitably controlled in analog fashion and/or switched on and off. With small fuel injection quantities, it is advantageous if the injection duration can be prolonged by throttling, which especially with Diesel combustion leads to quiet operation at low loads. It is also possible to deliver the pre-injection quantity throttled by the controllable throttle 57. The described device is especially intended, however, for injection in an Otto engine, or for direct injection into the combustion chamber in engines having externally supplied ignition. Once again, with a lower temperature and pressure level than in the Diesel combustion system, the fuel can be optimally prepared by the very early introduction of a pre-injection quantity into the combustion chamber, and the primary fuel quantity can still be supplied to the combustion chamber before the instant of ignition. With the aid of the controllable throttle 57, however, even this intermittent injection can be replaced with a kind of injection in which the injection takes place over a long period of time, for example from the onset of the aspiration of fresh air until shortly before the end of the compression stroke.

However, if only a single control block is provided for fuel injection over a plurality of fuel injection valves, then the magnet valves of the control block have to switch correspondingly more frequently. The overall result is that with the fuel injection device described, the fuel quantity arriving for injection can be metered while maintaining the widest possible injection onset range, controlled by the second magnet valve 52.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. A fuel injection device for an internal combustion engine having a fuel supply tank, a fuel feed pump (1) that pumps fuel from said fuel supply tank to a high-pressure reservoir (16) said high reservoir communicates with a reservoir chamber (38) via a first electrically controlled valve (45) which is electrically controlled by a control unit (75), for pre-storing a fuel injection quantity in said reservoir chamber (38), said reservoir chamber as defined by a movable wall (37) that is adjustable counter to a restoring force (63), and, via a second electrically controlled valve (52) electrically controlled by said control unit (75), said reservoir chamber (38) can be made to communicate with a fuel injection valve (25) via a connecting line (24), under the influence of the restoring force and with said first electrically controlled valve (45) closed, said reservoir chamber (38) can be evacuated toward the fuel injection valve (25), also associated with the adjustable wall (37) is a travel transducer (68) which generates a signal corresponding to the deflection travel of the adjustable wall (37) counter to the restoring force, which signal is connected to the control device (75), said control device (75) includes a comparison device for comparing the signal of the travel transducer with a set-point value formed as a function of operating parameters, and when the set-point value is attained the first electrically controlled valve (45) is closed once again whereby the filling of the reservoir chamber (38) in intervals is controlled by the triggering of the first electrically controlled valve (45).

2. A fuel injection device as defined by claim 1, in which said second electrically controlled valve (52) is opened and closed a plurality of times over an evacuation stroke of said adjustable wall (37), in order to control a pre-injection quantity.

3. A fuel injection device as defined by claim 1, which includes a throttle (57), disposed in the connecting line (24), said throttle (57) has a cross section which is controllable as a function of operating parameters.

4. A fuel injection device as defined by claim 2, which includes a throttle (57), disposed in the connecting line (24), said throttle (57) has a cross section which is controllable as a function of operating parameters.

5. A fuel injection device as defined by claim 3, in which said cross section of the throttle (57) can be decreased with a decreasing fuel injection quantity.

6. A fuel injection device as defined by claim 4, in which said cross section of the throttle (57) can be decreased with a decreasing fuel injection quantity.

7. A fuel injection device as defined by claim 5, in which throttling of the cross section of throttle (57) in the connecting line (24) is effected only for the duration of an opening of the second electrically controlled valve (52) which controls a pre-injection.

8. A fuel injection device as defined by claim 6, in which throttling of the cross section of throttle (57) in the connecting line (24) is effected only for the duration of an opening of the second electrically controlled valve (52) which controls a pre-injection.

9. A fuel injection device as defined by claim 1, which includes a plurality of injection valves and said connecting line (24) is connected successively with one at a time of said plurality of injection valves (25) via a distributor (28) that is drivable in synchronism with an rpm of said engine.

10. A fuel injection device as defined by claim 2, which includes a plurality of injection valves and said connecting line (24) is connected successively with one at a time of said plurality of injection valves (25) via a distributor (28) that is drivable in synchronism with an rpm of said engine.

11. A fuel injection device as defined by claim 3, which includes a plurality of injection valves and said connecting line (24) is connected successively with one at a time of said plurality of injection valves (25) via a distributor (28) that is drivable in synchronism with an rpm of said engine.

12. A fuel injection device as defined by claim 5, which includes a plurality of injection valves and said connecting line (24) is connected successively with one at a time of said plurality of injection valves (25) via a distributor (28) that is drivable in synchronism with an rpm of said engine.

13. A fuel injection device as defined by claim 7, which includes a plurality of injection valves and said connecting line (24) is connected successively with one at a time of said plurality of injection valves (25) via a distributor (28) that is drivable in synchronism with an rpm of said engine.

14. A fuel injection device as defined by claim 9, in which said distributor (28) is coupled to the drive shaft (2) of the feed pump (1).

15. A fuel injection device as defined by claim 1, in which said feed pump is a self-regulating pump, and a throttle in a fuel intake line of the feed pump is controlled as a function of the pressure in the high-pressure reservoir (16).

16. A fuel injection device as defined by claim 1, in which a pressure control valve (18) is connected parallel to the feed pump.

17. A fuel injection device as defined by claim 1, in which said first electrically controlled valve (45) and said second electrically controlled valve (52) are each a magnet valve with each including an armature (48) and windings (58), said armature (48) of each valve is connected to a valve needle (47, 53) in which each valve needle is disposed in a radial plane to a reservoir cylinder (36) that forms a reservoir chamber (38) and each have a sealing face (46) oriented toward said reservoir cylinder and cooperating with a valve seat (42) at an end of a pressure line (41) that discharges at its opposite end into the reservoir cylinder (36).

18. A fuel injection device as defined by claim 17, in which said windings (50) of the magnet valves envelop an armature chamber (43, 55), through which the fuel controlled by the respective magnet valve flows axially.

19. A fuel injection device as defined by claim 17, which includes a reservoir piston (37) displaceable as an adjustable wall in the reservoir cylinder (36), said reservoir piston includes a protruding end which is acted upon by a spring (63), and is connected to a movable part (67) of a travel transducer (68).

20. A fuel injection device as defined by claim 18, which includes a reservoir piston (37) displaceable as an adjustable wall in the reservoir cylinder (36), said reservoir piston includes a protruding end which is acted upon by a spring (63), and is connected to a movable part (67) of a travel transducer (68).

21. A fuel injection device as defined by claim 19, in which said spring (63) is disposed in a closed spring chamber (64), which is subjected to a controllable pressure.

22. A fuel injection device as defined by claim 20, in which said spring (63) is disposed in a closed spring chamber (64), which is subjected to a controllable pressure.

* * * * *